UNITED STATES PATENT OFFICE.

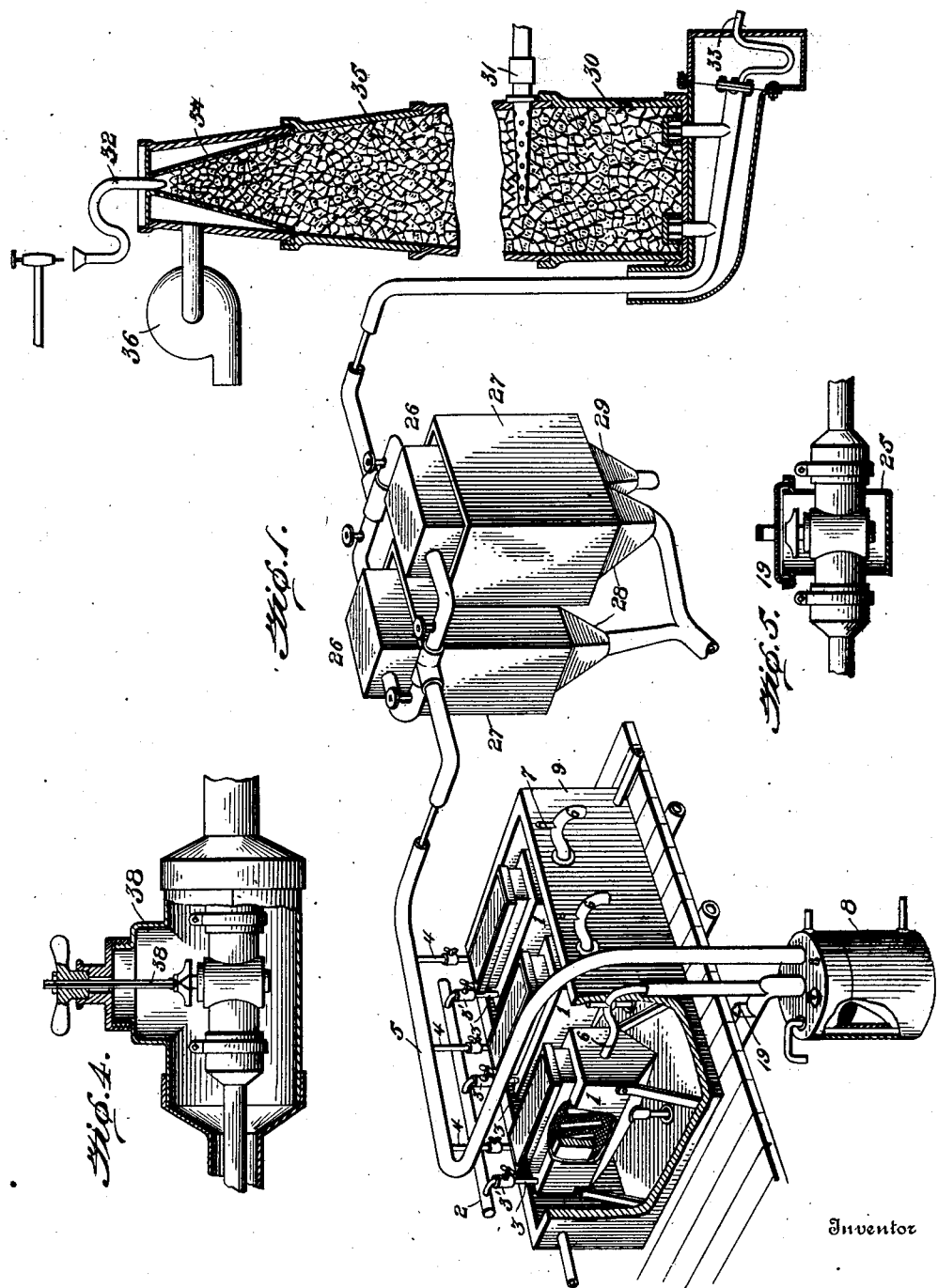

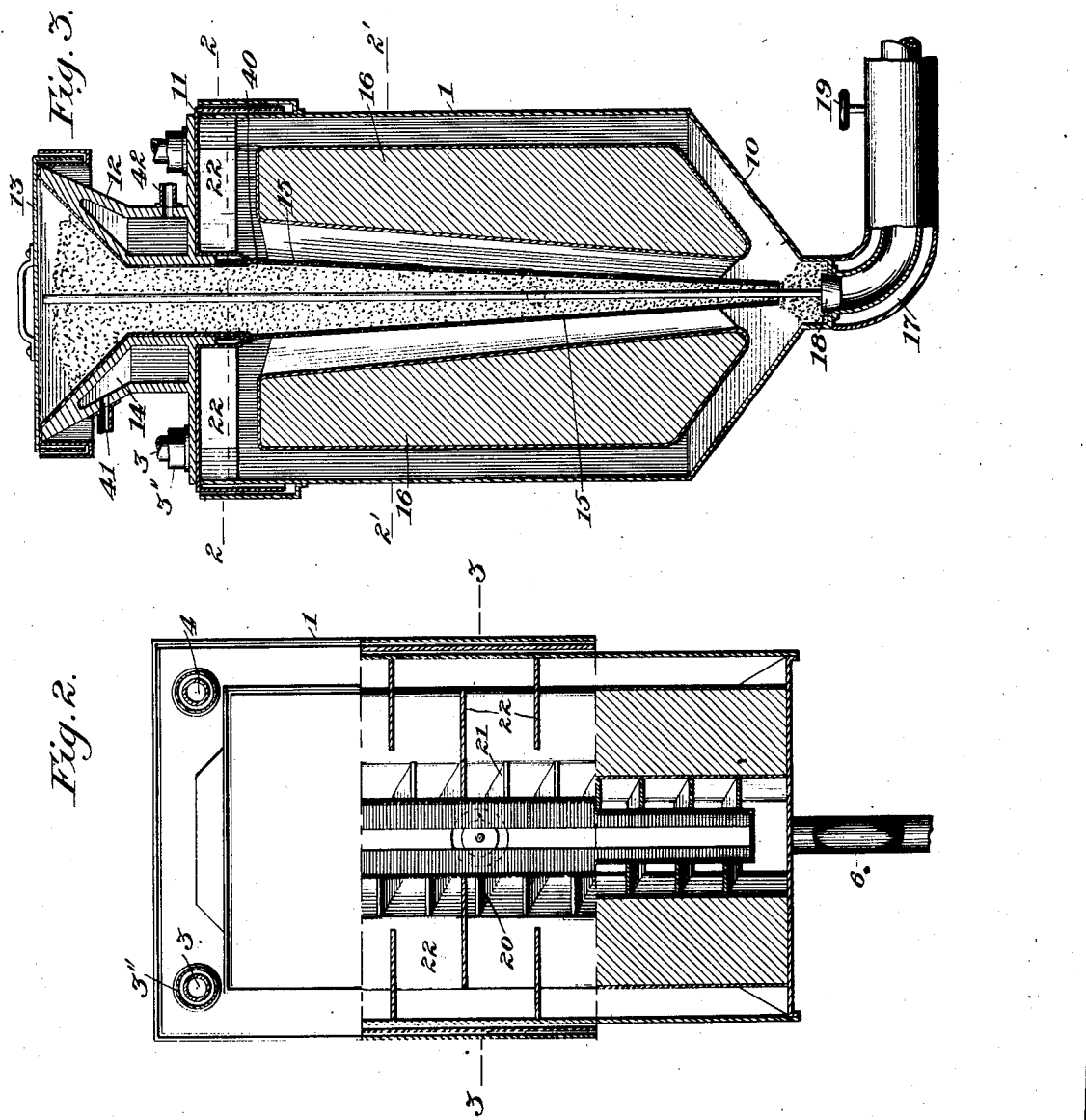

ELMER A. SPERRY, OF BROOKLYN, NEW YORK, ASSIGNOR TO CHEMICAL REDUCTION COMPANY, OF NEW YORK, N. Y., A CORPORATION OF NEW YORK.

APPARATUS FOR MAKING STANNIC CHLORID.

No. 877,243.      Specification of Letters Patent.      Patented Jan. 21, 1908.

Application filed December 7, 1905. Serial No. 290,768.

*To all whom it may concern:*

Be it known that I, ELMER A. SPERRY, a citizen of the United States, residing at Brooklyn, in the county of Kings and State of New York, have invented certain new and useful Improvements in Apparatus for Making Stannic Chlorid, of which the following is a specification.

This invention is an apparatus designed particularly for the production of chlorids of tin in an economical and expeditious manner and in accordance with the general method described and claimed in my copending application Serial Number 288,780, filed November 23, 1905.

For a full understanding of the invention reference is made to the accompanying drawings, illustrating a preferred construction and disposition of apparatus, wherein—

Figure 1 is a perspective view of a form of apparatus constructed in accordance with my invention, parts being broken away and the scrubber being shown in vertical section; Fig. 2 is a plan view, partly broken away on lines 2—2 and 2'—2' of Fig. 3, of one of the reaction vessels; Fig. 3 is a vertical section of the same on line 3—3 of Fig. 2; and Figs. 4 and 5 are detail views of forms of valves or cocks which may be employed.

Referring to the figures 1, 1, 1 represent reaction vessels designed to receive a tin bearing material and chlorin and to effect their combination. The tin-bearing material may be in any desired form so long as the tin content is metallic and sufficient in amount to warrant treatment and recovery in the form herein contemplated.

2 is a chlorin main communicating with the several vessels by valved pipes 3, and 4, 4 are valved vapor outlets for the vessels, leading to a common vapor main 5. Discharge pipes 6, provided with vents 7, serve to maintain the liquid content of the vessels at constant level and permit it to overflow to a vessel 8 wherein the liquid chlorids are separated by filtration or otherwise from any solid matter, products or undissolved residue.

Several reaction vessels are preferably inclosed, as shown, within a single tank or jacket 9, provided with means for circulation of water or a solution of a suitable temperature for maintenance of the proper temperature within the reaction vessels 1, this arrangement having the advantage that a transfer of heat is effected between several reaction vessels, the temperature of which is thereby equalized if they are in varying stages of the reaction.

As more particularly shown in Figs. 2, 3, each reaction vessel is preferably of elongated shape, having a converging bottom 10 and a luted cover 11, the latter carrying a hopper 12 having its discharge nozzle 40 below the liquid level within the vessel which is also preferably provided with a luted cover as indicated at 13; this hopper is provided with a jacket 14 whereby it may be heated for purposes hereinafter described. 41 and 42 are respectively inlets and outlets for this jacket. Interiorly the vessel is provided with a central perforated or pervious container 15 for tin or tin bearing material on each side of which are septa or partial partitions 16. These septa may conveniently be of wood sheathed with metal, and serve to partially subdivide the reaction vessel in such manner that the liquid contents are maintained in a more or less violent state of agitation or motion. The construction is such as to secure a definite circulation of the liquid contents as hereinafter described. From the bottom of each reaction vesssel a pipe 17 leads to the vessel 8; the pipe 5 forming a vent therefor is jacketed for heating or temperature control as shown. The mouth of the pipe 17 within the reaction vessel is closed by a plug 18, the purpose of which is to prevent the solid contents of the vessel from entering the pipe 17; the plug is not of necessity liquid tight, the retention of liquid being secured by a cock 19. The pipe 17 is in general used only for discharging the contents of the vessel, the overflow normally occurring through pipe 6 as above described. Pipes 6 and 17 are jacketed as shown, and are either directly heated to such temperature as will maintain material passing through them in a liquid state, or are so covered and protected against loss of heat as to accomplish this result.

Inasmuch as considerable heat is developed by the chlorination of tin in these reaction vessels, the columns of liquid between the tin and the septa 16, are of lesser specific gravity than the columns adjacent to the sides of the reaction vessels, and a definite and effective circulation or agitation of the liquid is thereby secured, the liquid moving upwardly in contact with the tin in the container, thence transversely to the outer walls of the vessel and downwardly to the lower end of the container. Some of the material which escapes through the meshes of the perforated container 15 and also out at the lower end is picked up by the circulating liquid and the reaction goes forward in the agitated masses as they circulate. These reactions are found to be most vigorous, however, in the central channel with the result described. The lower end of the container is preferably open as shown, any solid residues from the operation gradually accumulating in the lower portion of the vessel from which they may be flushed out through pipes 17 from time to time, portions remaining in the container 15 being removed in any suitable manner. Material which is carried in suspension in the liquid escapes through the overflow 6 to the reservoir 8 and is there separated as before described.

I have indicated at 20, 21 a series of vanes projecting from the septa 16 into contact with the container 15 and serving to support the latter at short intervals. These vanes preferably incline to the vertical, the inclination being in opposite directions on opposite sides of the container as clearly shown in Fig. 2; the purpose of this inclination is to direct the circulating liquid in a substantially helical path, in order that it may move from end to end of the vessel in addition to its movement of circulation therein.

22 indicates a series of baffles carried by the cover 11 and projecting beneath the surface of the liquid in the vessel 1, these baffles affording a restricted and tortuous path for the chlorin passing between the inlet 3 and the outlet 4. In this manner the chlorin is maintained for a longer period in contact with the liquid chlorid, and is thereby more effectively absorbed.

As above stated, the reaction vessels are preferably maintained at such temperature that the hydrated and anhydrous stannic chlorids exist therein as liquids capable of absorbing chlorin and conveying the same into contact with metallic tin inside and outside the container 15. These liquid chlorids overflow into a jacketed filter 8, which is maintained at a suitable temperature; this filter may be of any preferred construction, the form shown being provided with an external jacket 23 and an interior filtering plate 24.

In order to maintain the valves for handling the liquid chlorid in operative condition, any crystallization therein must be guarded against; this is most conveniently effected by inclosing the valve in a jacketing sheath as shown at 25 in Fig. 5.
The vapors arising from the reaction vessels 1, together with those from the filter or reservoir 8, usually contain, in addition to any residual or uncondensed gases, a certain proportion of both anhydrous and hydrated stannic chlorids. These vapors are conducted through a jacketed or heated pipe 5 to condensers 26, 26, preferably arranged in pairs as shown in order that they may be used alternately if required. These condensers may be of any usual construction, and are shown as provided with cooling jackets 27 and with a plurality of discharge openings 28, 29, the discharge openings 28 being for the anhydrous stannic chlorid and the openings 29 for the convenient removal of any crystalline deposit of the hydrated chlorid.

The separation of chlorid of tin from the gases in the condensers is ordinarily incomplete, and the residual portions are preferably removed by leading the gases into contact with water in a scrubber or tower 30. I have found it preferable in practice to subject these gases to the action of water at successively higher and lower temperatures as, for instance, by admitting hot water through a lower inlet or spray 31 and cold water through an upper inlet 32. By this means all traces of tin compounds are separated; obviously communicating scrubbers for hot and cold water respectively may be used, or any means may be employed for effecting the same result. The product from the scrubber 30, collected as at 33, is a stannic chlorid solution the concentration of which will obviously depend upon the proportion of water used to the stannic chlorid in the vapors. A solution having a density of 50–60° Bé., being a marketable product, is readily prepared. An inverted perforated cone 34 is preferably provided in the upper portion of the scrubber for the purpose of affording a free outlet for the gases from the divided filling material 35 therein. The exhaust fan 36 serves to maintain a diminished pressure in the scrubber 30 as compared with the pressure in the reaction vessels and thereby to insure a movement of the gases through the system and a discharge of the residual gases. It is essential in the treat-
11 ment of these vapors that the condensation or separation of the chlorids of tin should occur only in such portions of the apparatus as are especially designed for their recovery. In order to insure this the vapor pipe 5, to-
1 gether with the valves therein, is heated as before described. For the same reason the vapor pipe leading from the condenser to the scrubber, together with its valves, is heated. The inlet pipes 3 for the chlorin also the inlet chlorin valves 3' are shown to be jacketed (see Figs. 2 and 3) at 3" so their temperature may be controlled. By this means the pipes are maintained free from condensed material and crystals at all times. Any suitable forms of valves may be employed in the vapor lines; a convenient form being as indicated in Fig. 4 in which the jacket for the pipes is continued over the cock in the form of a sheath 37, the cock being provided with an extension 38 whereby it may be manipulated from the exterior of the jacket. It is further advisable in order to prevent the caking or clogging from any cause of the material to be fed to the container to jacket the feeding device or hopper as shown at 14, whereby the material is maintained preferably at a temperature above the melting point of the hydrated chlorids. The heated portions extend into contact with the reacting masses at a point below the surface of the liquid where the discharge nozzle 40 of the hopper 12 is seen to be sealed by the liquid in Fig. 3, the surface of the liquid being shown by the dotted line immediately under 22, 22.

I claim:—

1. Apparatus for producing stannic chlorid comprising a reaction vessel, means out of contact with the contents of the vessel for controlling the temperature therein, feed and discharge orifices for the contents of the vessel, gas inlet and outlet pipes communicating with the vessel above the normal liquid level therein, and exterior means for heating said pipes.

2. Apparatus for producing stannic chlorid comprising a reaction vessel, means out of contact with the contents of the vessel for controlling the temperature therein, feed and discharge orifices for the contents of the vessel, jacketed gas inlet and outlet pipes communicating with the vessel above the normal liquid level therein, a valve in one of said jacketed pipes, and exterior means for heating said valve.

3. Apparatus for producing stannic chlorid comprising a reaction vessel, means out of contact with the contents of the vessel for controlling the temperature therein, means for imparting motion to the contents of the vessel, feed and discharge orifices for the contents of the vessel, gas inlet and outlet pipes communicating with the vessel above the normal liquid level therein, and exterior means for heating said pipes.

4. Apparatus for producing stannic chlorid comprising a reaction vessel, a plurality of condensers, a conduit between the vessel and condensers, valves for the condensers, and means for heating said valves.

5. Apparatus for producing stannic chlorid comprising a reaction vessel, a scrubber, means for controlling the flow of the gases and vapors passing from the vessel to the scrubber and a device for controlling the temperature of said controlling means.

6. Apparatus for producing stannic chlorid comprising a reaction vessel and condenser communicating therewith, a scrubber, a conduit connecting the said members and means for heating the conduit.

7. Apparatus for producing stannic chlorid comprising a reaction vessel and condenser communicating therewith, a scrubber, a conduit connecting the said members and means for heating the conduit disposed exterior to the said conduit.

8. Apparatus for producing stannic chlorid comprising a reaction vessel, for containing a liquid, means for supplying chlorin to the said vessel, a device for introducing tin below the liquid level in such vessel and means for controlling the temperature of the vessel.

9. Apparatus for producing stannic chlorid comprising a reaction vessel, for containing a liquid, means for causing motion of such liquid, means for supplying chlorin to the said vessel, a device for introducing tin below the liquid level in such vessel and means for controlling the temperature of the vessel.

10. Apparatus for producing stannic chlorid comprising a reaction vessel, for containing a liquid, means for supplying chlorin to the said vessel, a device for introducing tin below the liquid level in such vessel, means for controlling the temperature of the vessel and means for heating the device.

11. In an apparatus for producing stannic chlorid a reaction vessel, for containing a liquid, means for maintaining the liquid in a state of agitation, the vessel having a bottom outlet, a liquid tight valve in the outlet and a removable closure at the mouth of said outlet.

12. Apparatus for producing stannic chlorid comprising a reaction vessel, a device for maintaining tin in excess within the vessel, a conduit for introducing chlorin, a vapor escape pipe for the vessel and means for temperature control of the device and the pipe.

13. Apparatus for producing stannic chlorid comprising a reaction vessel, means for maintaining a body of tin in the central portion of the vessel, means for temperature control of the vessel, means for partially subdividing the vessel whereby a definite circulation of the contents is secured.

14. A vessel for containing stannic chlorid, means for maintaining a body of tin submerged within a body of liquid therein, means for maintaining a supply of chlorin above the liquid level, means for causing motion of the liquid and means for temperature control of the vessel.

15. A vessel for containing stannic chlorid, means for maintaining a body of tin submerged within a body of liquid therein, means for drawing chlorin in a restricted path above the liquid level, means for causing motion of the liquid and means for temperature control of the vessel.

16. Apparatus for producing stannic chlorid comprising a reaction vessel, a perforate container for tin in the central portion of the vessel, a hopper connected therewith and means for temperature control of the hopper.

17. A vessel for containing liquid stannic chlorid, an inlet for tin communicating with said vessel below the liquid level, means for heating said inlet, an externally heated eduction gas passage for the vessel, and a heated liquid outlet for said vessel.

18. A vessel for containing stannic chlorid, means out of contact with the contents of the vessel for controlling the temperature therein, valved induction and eduction pipes for the vessel, jackets for each of said valves, and means for supplying a heating medium to said jackets.

19. A vessel for containing stannic chlorid, means out of contact with the contents of the vessel for controlling the temperature therein, a receptacle for said chlorid, a heated conduit between said vessel and receptacle, an externally heated vent pipe for the receptacle and an externally heated valve in said conduit.

20. In apparatus for producing stannic chlorid, a reaction vessel, a jacketed conduit, a scrubber having a vapor inlet connected with the conduit, and means for subjecting the vapors to contact with a solvent successively at higher and lower temperatures.

21. Apparatus for producing stannic chlorid comprising a reaction vessel, a vapor outlet therefor, a condenser connected with said vapor outlet, means for separating stannic chlorid from the vapors traversing said condenser, and means for reducing the gas pressure in said separating means.

22. Apparatus for producing stannic chlorid comprising a reaction vessel having an inlet, means for controlling said inlet, a vapor outlet for said reaction vessel, a condenser connected with said vapor outlet, means for separating stannic chlorid from the vapors traversing said condenser, and means for reducing the gas pressure in said separating means.

23. Apparatus for producing stannic chlorid comprising a reaction vessel for containing a body of liquid anhydrous stannic chlorid, means for controlling the temperature of the vessel, means for agitating said body, and means for supplying chlorin above the surface of the liquid in said reaction vessel.

24. Apparatus for producing stannic chlorid comprising a reaction vessel for containing a tin-bearing material, and a body of an anhydrous liquid, means for controlling the temperature of the vessel, means for agitating said liquid and maintaining the tin-bearing material in suspension therein, and means for supplying chlorin to said reaction vessel.

25. Apparatus for producing stannic chlorid comprising a reaction vessel, a condenser, a conduit connecting said vessel and condenser, and means for heating said conduit.

26. A vessel for containing stannic chlorid, means for maintaining a body of tin submerged within a body of liquid therein, means for maintaining a supply of chlorin, means for causing motion of the liquid and means out of contact with the liquid for controlling its temperature.

In testimony whereof I affix my signature in presence of two witnesses.

ELMER A. SPERRY.

Witnesses:
L. A. WELLES,
W. P. PALMER.